United States Patent
Liu et al.

(10) Patent No.: US 12,202,957 B2
(45) Date of Patent: Jan. 21, 2025

(54) ETHYLENE-BASED MODIFIER, ETHYLENE-BASED RESIN COMPOSITION, FILM, METHOD FOR PRODUCING ETHYLENE-BASED RESIN COMPOSITION, AND METHOD FOR PRODUCING FILM

(71) Applicant: Sumitomo Chemical Company, Limited, Tokyo (JP)

(72) Inventors: Chen Liu, Ichihara (JP); Takaya Ichimiya, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/235,743

(22) Filed: Aug. 18, 2023

(65) Prior Publication Data

US 2023/0391993 A1    Dec. 7, 2023

Related U.S. Application Data

(62) Division of application No. 17/858,188, filed on Jul. 6, 2022, now Pat. No. 11,773,243.

(30) Foreign Application Priority Data

Jul. 9, 2021   (JP) ................................ 2021-114525

(51) Int. Cl.
C08L 23/08 (2006.01)
C08J 3/00 (2006.01)
C08J 5/18 (2006.01)

(52) U.S. Cl.
CPC ........... *C08L 23/0815* (2013.01); *C08J 3/005* (2013.01); *C08J 5/18* (2013.01); *C08J 2323/08* (2013.01); *C08J 2423/08* (2013.01); *C08L 2205/025* (2013.01)

(58) Field of Classification Search
None
See application file for complete search history.

(56) References Cited

U.S. PATENT DOCUMENTS

| 11,149,102 | B2 | 10/2021 | Ochi et al. |
| 2013/0029125 | A1 | 1/2013 | Tse et al. |
| 2013/0226234 | A1 | 8/2013 | Avelar et al. |
| 2015/0018491 | A1 | 1/2015 | Satoh et al. |
| 2018/0002517 | A1 | 1/2018 | Canich et al. |
| 2021/0122854 | A1 | 4/2021 | Ochi et al. |
| 2021/0130563 | A1 | 5/2021 | Someya et al. |
| 2021/0284829 | A1 | 9/2021 | Ochi et al. |
| 2021/0403687 | A1 | 12/2021 | Mino et al. |

FOREIGN PATENT DOCUMENTS

| JP | 2016113621 A | 6/2016 |
| JP | 2017061122 A | 3/2017 |
| JP | 2021070808 A | 5/2021 |
| JP | 2021143281 A | 9/2021 |
| WO | 2017127185 A1 | 7/2017 |
| WO | 2018164169 A1 | 9/2018 |

OTHER PUBLICATIONS

Fleury et al. Rheology Acta, 44: 174-187 (Year: 2004).*
R. H. Ewoldt, et al., "New measures for characterizing nonlinear viscoelasticity in large amplitude oscillatory shear," J. Rheol., 52(6), pp. 1427-1458 (2008).

* cited by examiner

*Primary Examiner* — Mark S Kaucher
(74) *Attorney, Agent, or Firm* — Panitch Schwarze belisario & Nadel LLP

(57) ABSTRACT

Provided is an ethylene-based modifier with which a film having good slipperiness and relatively less fish eyes can be formed. The ethylene-based modifier has a strain-hardening exponent of 0.27 or more and 0.53 or less as determined by the LAOS method.

10 Claims, No Drawings

ETHYLENE-BASED MODIFIER, ETHYLENE-BASED RESIN COMPOSITION, FILM, METHOD FOR PRODUCING ETHYLENE-BASED RESIN COMPOSITION, AND METHOD FOR PRODUCING FILM

CROSS-REFERENCE TO RELATED APPLICATIONS

This application is a divisional of co-pending U.S. patent application Ser. No. 17/858,188, filed on Jul. 6, 2022, which claims priority under 35 U.S.C. § 119 (b) to Japanese Application No. 2021-114525, filed on Jul. 9, 2021, the disclosures of which are incorporated herein by reference in their entirety.

BACKGROUND OF THE INVENTION

Field of the Invention

The present invention relates to an ethylene-based modifier, an ethylene-based resin composition, a film, a method for producing an ethylene-based resin composition, and a method for producing a film.

Description of the Related Art

In the related art, various films have been used to package foods, detergents, and other products. These films need to have good slipperiness for the purpose of achieving, for example, smooth production in the process for producing the films themselves, the process for producing products (e.g., packaging pouches for foods or other products) using the films, and other processes. An example of such a film is a multi-layer film having good slipperiness disclosed in WO 2018/164169.

The multi-layer film has, on the surface, a layer formed by using an ethylene-based resin composition containing a component (A) and a component (B). The ethylene-based resin composition contains, as the component (A), an ethylene-α-olefin copolymer having a density of 915 kg/m$^3$ or more and 950 kg/m$^3$ or less, a melt flow rate of g/10 min or more and 0.2 g/10 min or less, and a zero shear viscosity of $1 \times 10^3$ Pa·sec or more and $1 \times 10^7$ Pa·sec or less. The ethylene-based resin composition contains, as the component (B), an ethylene-α-olefin copolymer having a density of 890 kg/m$^3$ or more and 930 kg/m$^3$ or less, a melt flow rate of 0.5 g/10 min or more and g/10 min or less, and a melt flow rate ratio of 10 or more and 30 or less. The ethylene-based resin composition contains 1 mass % or more and 30 mass % or less of the component (A) with respect to 100 mass % of the total mass of the component (A) and the component (B).

SUMMARY OF THE INVENTION

However, a film having a layer formed by using the ethylene-based resin composition as described above has good slipperiness, but there is a need to further reduce fish eyes (appearance defects) generated in the film.

The present invention has been made to solve such a problem and is directed to an ethylene-based modifier, an ethylene-based resin composition, and a method for producing the ethylene-based resin composition with/by which a film having good slipperiness and relatively less fish eyes can be formed. The present invention is also directed to a film having good slipperiness and relatively less fish eyes and a method for producing the film.

An ethylene-based modifier according to the present invention has a strain-hardening exponent of 0.27 or more and 0.53 or less as determined by the LAOS method.

The ethylene-based resin composition according to the present invention has an average relaxation time of 50 sec or longer and 160 sec or shorter.

A film according to the present invention includes an ethylene-based resin layer containing the ethylene-based resin composition.

A method for producing the ethylene-based resin composition according to the present invention includes the following step 1 and the following step 2.
<Step 1>
A step of melt-kneading 50 mass % or more and 90 mass % or less of the component (A) and 10 mass % or more and 50 mass % or less of the component (B) with respect to 100 mass % of the total mass of the component (A) and the component (B) to provide an ethylene-based modifier.
<Step 2>
A step of melt-kneading the ethylene-based modifier obtained in the step 1 and the following component (B) to provide an ethylene-based resin composition, wherein the ethylene-based resin composition contains 15 mass % or more and 45 mass % or less of the following component (A) with respect to 100 mass % of the total mass of the ethylene-based resin composition.
Component (A): Ethylene-α-Olefin Copolymer
  density: 915 kg/m$^3$ or more and 950 kg/m$^3$ or less
  ratio (Mw/Mn) of weight-average molecular weight to number-average molecular weight: 7.3 or more
Component (B): Ethylene-α-Olefin Copolymer
  density: 890 kg/m$^3$ or more and 930 kg/m$^3$ or less
  MFR: 0.5 g/10 min or more and 5.0 g/10 min or less
  MFRR: 10 or more and 30 or less The ethylene-based resin composition according to the present invention is obtained by a production method including the following step 1 and the following step 2.
<Step 1>
A step of melt-kneading 50 mass % or more and 90 mass % or less of the component (A) and 10 mass % or more and 50 mass % or less of the component (B) with respect to 100 mass % of the total mass of the component (A) and the component (B) to provide an ethylene-based modifier.
<Step 2>
A step of melt-kneading the ethylene-based modifier obtained in the step 1 and the following component (B) to provide an ethylene-based resin composition, wherein the ethylene-based resin composition contains 15 mass % or more and 45 mass % or less of the following component (A) with respect to 100 mass % of the total mass of the ethylene-based resin composition.
Component (A): Ethylene-α-Olefin Copolymer
  density: 915 kg/m$^3$ or more and 950 kg/m$^3$ or less
  ratio (Mw/Mn) of weight-average molecular weight to number-average molecular weight: 7.3 or more
Component (B): Ethylene-α-Olefin Copolymer
  density: 890 kg/m$^3$ or more and 930 kg/m$^3$ or less
  MFR: 0.5 g/10 min or more and 5.0 g/10 min or less
  MFRR: 10 or more and 30 or less The method for producing the film according to the present invention includes the following step 1, the following step 2, and the following step 3.
<Step 1>
A step of melt-kneading 50 mass % or more and 90 mass % or less of the component (A) and 10 mass % or more and 50 mass % or less of the component (B) with respect to 100 mass % of the total mass of the component (A) and the component (B) to provide an ethylene-based modifier.
<Step 2>
A step of melt-kneading the ethylene-based modifier obtained in the step 1 and the following component (B) to provide an ethylene-based resin composition, wherein the ethylene-based resin composition contains 15 mass % or more and 45 mass % or less of the following component (A) with respect to 100 mass % of the total mass of the ethylene-based resin composition.
<Step 3>
A step of forming a film having an ethylene-based resin layer by a cast film process using the ethylene-based resin composition obtained in the step 2.
Component (A): Ethylene-α-Olefin Copolymer
  density: 915 kg/m$^3$ or more and 950 kg/m$^3$ or less
  ratio (Mw/Mn) of weight-average molecular weight to number-average molecular weight: 7.3 or more
Component (B): Ethylene-α-Olefin Copolymer
  density: 890 kg/m$^3$ or more and 930 kg/m$^3$ or less
  MFR: 0.5 g/10 min or more and 5.0 g/10 min or less
  MFRR: 10 or more and 30 or less The film according to the present invention is obtained by a method for producing the film including the following step 1, the following step 2, and the following step 3.
<Step 1>
A step of melt-kneading 50 mass % or more and 90 mass % or less of the component (A) and 10 mass % or more and 50 mass % or less of the component (B) with respect to 100 mass % of the total mass of the component (A) and the component (B) to provide an ethylene-based modifier.
<Step 2>
A step of melt-kneading the ethylene-based modifier obtained in the step 1 and the following component (B) to provide an ethylene-based resin composition, wherein the ethylene-based resin composition contains 15 mass % or more and 45 mass % or less of the following component (A) with respect to 100 mass % of the total mass of the ethylene-based resin composition.
<Step 3>
A step of forming a film having an ethylene-based resin layer by a cast film process using the ethylene-based resin composition obtained in the step 2.
Component (A): Ethylene-α-Olefin Copolymer
  density: 915 kg/m$^3$ or more and 950 kg/m$^3$ or less
  ratio (Mw/Mn) of weight-average molecular weight to number-average molecular weight: 7.3 or more
Component (B): Ethylene-α-Olefin Copolymer
  density: 890 kg/m$^3$ or more and 930 kg/m$^3$ or less
  MFR: 0.5 g/10 min or more and 5.0 g/10 min or less
  MFRR: 10 or more and 30 or less The present invention can provide an ethylene-based modifier, an ethylene-based resin composition, and a method for producing the ethylene-based resin composition with/by which a film having good slipperiness and relatively less fish eyes can be formed. The present invention can also provide a film having good slipperiness and relatively less fish eyes and a method for producing the film.

DETAILED DESCRIPTION OF THE PREFERRED EMBODIMENTS

Embodiments of the present invention will be described below, but the present invention is not limited to the following embodiments.

<Ethylene-Based Modifier>
The strain-hardening exponent of an ethylene-based modifier according to an embodiment determined by the LAOS method is 0.27 or more and 0.53 or less, preferably 0.27 or more and 0.50 or less, more preferably 0.27 or more and or less. The strain-hardening exponent can be determined by the method described below in Examples.

The ethylene-based modifier preferably contains the component (A) and the component (B). Specifically, the ethylene-based modifier is preferably consisting of the component (A) and the component (B). When the ethylene-based modifier contains the component (A) and the component (B), the content of the component (A) with respect to 100 mass % of the total mass of the component (A) and the component (B) is preferably 50 mass % or more and 90 mass % or less, more preferably 60 mass % or more and 90 mass % or less, still more preferably 70 mass % or more and 90 mass % or less. When the ethylene-based modifier contains the component (A) and the component (B), the content of the component (B) with respect to 100 mass % of the total mass of the component (A) and the component (B) is preferably 10 mass % or more and 50 mass % or less, more preferably 10 mass % or more and 40 mass % or less, still more preferably mass % or more and 30 mass % or less.

<Component A>
An ethylene-α-olefin copolymer can be used as the component (A). The term "ethylene-α-olefin copolymer" refers to a copolymer having an ethylene-based monomer unit and an α-olefin-based monomer unit, wherein the total content of the ethylene-based monomer unit and the α-olefin-based monomer unit is 95 mass % or more with respect to 100 mass % of the total mass of the copolymer. The term "α-olefin" refers to a linear or branched olefin having a carbon-carbon unsaturated double bond at the α-position. The ethylene-α-olefin copolymer may include an ethylene-based monomer unit and a C3-20 α-olefin-based monomer unit, may include an ethylene-based monomer unit and a C4-20 α-olefin-based monomer unit, may include an ethylene-based monomer unit and a C5-20 α-olefin-based monomer unit, or may include an ethylene-based monomer unit and a C6-20 α-olefin-based monomer unit.

Examples of the C3-20 α-olefin in the component (A) include propylene, 1-butene, 1-pentene, 1-hexene, 1-heptene, 1-octene, 1-nonene, 1-decene, 1-dodecene, 4-methyl-1-pentene, and 4-methyl-1-hexene. The C3-20 α-olefin is preferably 1-hexene, 4-methyl-1-pentene, or 1-octene, more preferably 1-hexene or 1-octene among these. As the C3-20 α-olefin, one of the above substances may be used alone, or two or more of the above substances may be used in combination.

The content of the ethylene-based monomer unit in the component (A) is preferably 80 mass % or more and 97 mass % or less, more preferably 85 mass % or more and 97 mass % or less, still more preferably 90 mass % or more and 97 mass % or less, with respect to 100 mass % of the total mass of the component (A). The content of the α-olefin-based monomer unit in the component (A) is preferably 3 mass % or more and mass % or less, more preferably 3 mass % or more and 15 mass % or less, still more preferably 3 mass % or more and 10 mass % or less, with respect to 100 mass % of the total mass of the component (A).

Examples of the component (A) include an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, and an ethylene-1-butene-1-octene copolymer. Among these, the component (A) is preferably an ethylene-1-hexene copolymer, an ethylene-4-methyl-1- pentene copolymer, an ethylene-1-butene-1-hexene copolymer, an ethylene-1-butene-4-methyl-1-pentene copolymer, an ethylene-1-octene copolymer, an ethylene-1-hexene-1-octene copolymer, or an ethylene-1-butene-1-octene copolymer, more preferably an ethylene-1-hexene copolymer, an ethylene-1-octene copolymer, an ethylene-1-butene-1-hexene copolymer, or an ethylene-1-butene-1-octene copolymer, still more preferably an ethylene-1-hexene copolymer or an ethylene-1-butene-1-hexene copolymer.

The component (A) may have a monomer unit based on a monomer other than ethylene and C3-20 α-olefins. Examples of the monomer unit based on a monomer other than ethylene and C3-20 α-olefins include a conjugated diene, such as butadiene or isoprene; a non-conjugated diene, such as 1,4-pentadiene; acrylic acid; an acrylic acid ester, such as methyl acrylate or ethyl acrylate; methacrylic acid; a methacrylic acid ester, such as methyl methacrylate or ethyl methacrylate; and vinyl acetate.

To improve the slipperiness of the film, the density of the component (A) is, for example, preferably 910 kg/m$^3$ or more, more preferably 915 kg/m$^3$ or more, still more preferably 918 kg/m$^3$ or more, yet still more preferably 922 kg/m$^3$ or more. To prevent or reduce generation of fish eyes in the film, the density of the component (A) is, for example, preferably 950 kg/m$^3$ or less, more preferably 940 kg/m$^3$ or less, still more preferably 935 kg/m$^3$ or less, yet still more preferably 930 kg/m$^3$ or less. The density of the component (A) may be 910 kg/m$^3$ or more and 950 kg/m$^3$ or less in one aspect, may be 910 kg/m$^3$ or more and 940 kg/m$^3$ or less in another aspect, or may be 915 kg/m$^3$ or more and 950 kg/m$^3$ or less in yet another aspect. The density of the component (A) can be controlled in the above range by regulating the α-olefin concentration in gas-phase polymerization in the method for producing the component (A) described below (method for producing ethylene-α-olefin copolymer). The density can be determined by the method described below in Examples.

To prevent or reduce generation of fish eyes in the film, the melt flow rate (hereinafter also referred to as MFR) of the component (A) measured at a temperature of 190° C. and a load of 2.16 kg is, for example, preferably g/10 min or more, more preferably 0.0005 g/10 min or more, still more preferably 0.001 g/10 min or more. To improve the slipperiness of the film, the MFR of the component (A) is, for example, preferably 0.2 g/10 min or less, more preferably 0.15 g/10 min or less, still more preferably 0.1 g/10 min or less. The MFR of the component (A) may be 0.0001 g/10 min or more and 0.2 g/10 min or less in one aspect, may be 0.0005 g/10 min or more and 0.15 g/10 min or less in another aspect, or may be 0.001 g/10 min or more and 0.1 g/10 min or less in yet another aspect. The MFR of the component (A) is usually measured by using a sample prepared by blending the component (A) with about 1000 ppm (preferably 1000 ppm) of an antioxidant. The MFR can be controlled in the above range by regulating the concentration of a chain transfer agent in gas-phase polymerization in the method for producing the component (A) described below (method for producing ethylene-α-olefin copolymer). The MFR can be determined by the method described below in Examples.

To improve the slipperiness of the film, the zero shear viscosity (hereinafter also referred to as $\eta^0$) of the component (A) at a temperature of 190° C. is, for example, preferably $2\times10^3$ Pa·sec or more, more preferably $3\times10^5$ Pa·sec or more, still more preferably $5\times10^3$ Pa·sec or more. To reduce the extrusion load during film formation, the $\eta^0$ of the component (A) is, for example, preferably $5\times10^6$ Pa·sec or less, more preferably $3\times10^6$ Pa·sec or less, still more preferably $1\times10^6$ Pa·sec or less. The $\eta^0$ of the component (A) may be $2\times10^3$ Pa·sec or less and $5\times10^6$ Pa·sec or less in one aspect, may be $3\times10^3$ Pa·sec or more and $3\times10^6$ Pa·sec or less in another aspect, or may be $5\times10^3$ Pa·sec or more and $1\times10^6$ Pa·sec or less in yet another aspect.

The zero shear viscosity at a temperature of 190° C. is a value calculated by fitting the Carreau-Yasuda model represented by the following formula (1) to a shear viscosity ($\eta^*$; unit is Pa·sec)-angular frequency ($\omega$, unit is rad/sec) curve at a measurement temperature of 190° C. by using the non-linear least-squares method.

$$\eta^* = \eta^0 (1+(\lambda\omega)^a)^{(n-1)/a} \quad (1)$$

λ: time constant
a: breadth parameter
n: power-Law index

The shear viscosity is measured by using a viscoelasticity analyzer (e.g., Rheometrics Mechanical Spectrometer RMS800 available from Rheometrics) usually under the following conditions: geometry: parallel plate, plate diameter: 25 mm, test sample thickness: about 2.0 mm, angular frequency: 0.1 to 100 rad/sec, measurement points: 5 points per ω digit. The amount of distortion is appropriately selected in the range of 3% to 10% so as to enable detection of torque in the measurement range and prevent overtorque. The test sample is prepared by press forming into a thickness of 2 mm by pressing at a pressure of 2 MPa for 5 minutes with a heat press machine set at 150° C. and subsequent cooling for 5 minutes with a cooling press machine set at 30° C.

To improve the slipperiness of the film, the limiting viscosity (hereinafter also referred to as [η]) of the component (A) is, for example, preferably 1.0 dl/g or more, more preferably 1.2 dl/g or more, still more preferably 1.3 dl/g or more. To prevent or reduce generation of fish eyes in the film, the [η] of the component (A) is preferably 2.0 dl/g or less, more preferably 1.9 dl/g or less, still more preferably 1.7 dl/g or less. The [η] of the component (A) may be 1.0 dl/g or more and 2.0 dl/g or less in one aspect, may be 1.2 dl/g or more and 1.9 dl/g or less in another aspect, or may be 1.3 dl/g or more and 1.7 dl/g or less in yet another aspect. The limiting viscosity can be determined by the method described below in Examples.

To improve the slipperiness of the film, the ratio (hereinafter also referred to as Mw/Mn) of the weight-average molecular weight (hereinafter also referred to as Mw) to the number-average molecular weight (hereinafter also referred to as Mn) of the component (A) is, for example, preferably 7.3 or more, more preferably 7.5 or more, still more preferably 7.7 or more. To prevent or reduce generation of fish eyes in the film, the Mw/Mn of the component (A) is, for example, preferably 15.0 or less, more preferably 14.0 or less, still more preferably 13.0 or less. The Mw/Mn of the component (A) may be 7.3 or more and 15.0 or less in one aspect, may be 7.5 or more and 14.0 or less in another aspect, or may be 7.7 or more and 13.0 or less in yet another aspect. The Mw/Mn of the component (A) can be controlled in the above range by regulating the amount of electron-donating compound used with respect to the amount of organoaluminum compound used in gas-phase polymerization. The number-average molecular weight (Mn) and the weight-average molecular weight (Mw) can be determined by the method described below in Examples.

<Method for Producing Component (A)>

An example method for producing the component (A) (i.e., method for producing ethylene-α-olefin copolymer) includes copolymerizing ethylene and an α-olefin in the presence of an olefin polymerization catalyst. Examples of the olefin polymerization catalyst include a product formed by bringing into contact with each other a component (H) obtained by supporting an activation promoter component (hereinafter also referred to as component (I)) on a fine particle carrier, a metallocene complex, and an electron-donating compound; and a product formed by bringing the component (H), a metallocene complex, and an organoaluminum compound into contact with each other. Specifically, the olefin polymerization catalyst is preferably a prepolymerization catalyst component obtained by polymerizing (hereinafter referred to as prepolymerizing) a small amount of olefin in the presence of a catalyst component formed by bringing the component (H), a metallocene complex, and an organoaluminum compound into contact with each other.

Examples of the component (I) include zinc compounds. Examples of zinc compounds include a compound obtained by bringing diethylzinc, a fluorinated phenol, and water into contact with each other.

As the fine particle carrier, a porous substance having a 50% volume average particle diameter of 10 µm or more and 500 µm or less can be used. The 50% volume average particle diameter is measured by, for example, the light scattering/laser diffraction method. Examples of the fine particle carrier include inorganic substances and organic polymers. Examples of inorganic substances include inorganic oxides, such as $SiO_2$, $Al_2O_3$, MgO, $ZrO_2$, $TiO_2$, $B_2O_3$, CaO, ZnO, BaO, $ThO_2$; and clays and clay minerals, such as smectite, montmorillonite, hectorite, laponite, and saponite. Examples of organic polymers include polyethylene, polypropylene, and styrene-divinylbenzene copolymer. The fine particle carrier is preferably a fine particle carrier made of an inorganic substance (hereinafter referred to as an inorganic fine particle carrier). The pore volume of the fine particle carrier is not limited and may be, for example, 0.3 ml/g or more and 10 ml/g or less. The specific surface area of the fine particle carrier is not limited and may be, for example, $10\,m^2/g$ or more and $1000\,m^2/g$ or less. The pore volume and the specific surface area can be determined by the gas adsorption method. The pore volume can be determined by analyzing the gas desorption amount by the BJH method, and the specific surface area can be determined by analyzing the gas adsorption amount by the BET method.

A metallocene complex is a transition metal compound having a ligand including a cyclopentadiene anion skeleton. The metallocene complex is preferably a transition metal compound represented by the following general formula [a] or a µ-oxo type transition metal compound dimer thereof:

[a]

(wherein $M^2$ is a transition metal atom in the groups 3 to 11 in the Periodic Table or the lanthanoid series. $L^2$ is a group with a cyclopentadiene anion skeleton, and two or more $L^2$'s may be directly bonded to each other, or may be bonded to each other through a residue containing a carbon atom, a silicon atom, a nitrogen atom, an oxygen atom, a sulfur atom, or a phosphorus atom. $X^1$ is a halogen atom, a hydrocarbon group (excluding a group having a cyclopentadiene anion skeleton), or a hydrocarbon oxy group. a represents 2, and b represents 2.)

Examples of the electron-donating compound include triethylamine, triisobutylamine, and tri-n-octylamine. The electron-donating compound is preferably triethylamine.

Examples of the organoaluminum compound include trimethylaluminum, triethylaluminum, tributylaluminum, triisobutylaluminum, and tri-n-octylaluminum. The organoaluminum compound is preferably triisobutylaluminum or tri-n-octylaluminum, more preferably triisobutylaluminum.

Examples of the method for producing the component (A) include slurry polymerization and gas phase polymerization. Continuous gas phase polymerization is more preferred. Examples of solvents used in the slurry polymerization include inert hydrocarbon solvents, such as propane, butane, isobutane, pentane, hexane, heptane, and octane. The gas phase polymerization reactor used in the continuous gas phase polymerization is, for example, an apparatus having a fluidized-bed reaction vessel, preferably an apparatus having a fluidized bed reaction vessel having an enlarged part. The reaction vessel may have a stirring blade inside.

When the olefin polymerization catalyst includes a prepolymerization catalyst component, examples of the method for supplying the olefin polymerization catalyst (prepolymerization catalyst component) to a continuous polymerization reaction vessel for forming particles of the component (A) include a method of supplying the olefin polymerization catalyst in a dry state by using nitrogen, hydrogen, ethylene, or an inert gas, such as argon, and a method of dissolving or diluting the olefin polymerization catalyst in a solvent, and supplying it in a solution or slurry form.

The polymerization temperature in the gas-phase polymerization of the component (A) is preferably, for example, lower than the melting point of the component (A), specifically, preferably 0° C. or higher and 150° C. or lower, more preferably 30° C. or higher and 100° C. or lower, still more preferably 70° C. or higher and 87° C. or lower. Hydrogen may be added to adjust the melt fluidity of the component (A). The amount of hydrogen is preferably controlled at mol % or more and 1.1 mol % or less with respect to 100 mol % of ethylene. The ratio of hydrogen to ethylene in the gas phase polymerization can be controlled by regulating the amount of hydrogen generated during the polymerization and the amount of hydrogen added during the polymerization. An inert gas may be present in a mixed gas in the polymerization reaction vessel. When the olefin polymerization catalyst contains a prepolymerization catalyst component, the olefin polymerization catalyst may contain a promoter component, such as an organoaluminum compound.

<Component (B)>

An ethylene-α-olefin copolymer can be used as the component (B). The ethylene-α-olefin copolymer may include an ethylene-based monomer unit and a C3-20 α-olefin-based monomer unit, may include an ethylene-based monomer unit and a C4-20 α-olefin-based monomer unit, may include an ethylene-based monomer unit and a C5-20 α-olefin-based monomer unit, or may include an ethylene-based monomer unit and a C6-20 α-olefin-based monomer unit.

Examples of the C3-20 α-olefin in the component (B) include propylene, 1-butene, 1-pentene, 1-hexene, 1-heptene, 1-octene, 1-nonene, 1-decene, 1-dodecene, 4-methyl-1-pentene, and 4-methyl-1-hexene. The C3-20 α-olefin is preferably 1-hexene, 4-methyl-1-pentene, or 1-octene, more preferably 1-hexene or 1-octene among these. As the C3-20 α-olefin, one of the above substances may be used alone, or two or more of the above substances may be used in combination.

The content of the ethylene-based monomer unit in the component (B) is preferably 50 mass % or more and 99.5 mass % or less, more preferably 60 mass % or more and 98 mass % or less, still more preferably 70 mass % or more and 97 mass % or less, with respect to 100 mass % of the total mass of the component (B). The content of the α-olefinbased monomer unit in the component (B) is preferably 0.5 mass % or more and 50 mass % or less, more preferably 2 mass % or more and mass % or less, still more preferably 3 mass % or more and mass % or less, with respect to 100 mass % of the total mass of the component (B).

Examples of the component (B) include an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, and an ethylene-1-butene-1-octene copolymer. Among these, the component (B) is preferably an ethylene-1-hexene copolymer, an ethylene-4-methyl-1-pentene copolymer, or an ethylene-1-octene copolymer, more preferably an ethylene-1-hexene copolymer.

The component (B) may have a monomer unit based on a monomer other than ethylene and C3-20 α-olefins. Examples of the monomer unit based on a monomer other than ethylene and C3-20 α-olefins include a conjugated diene, such as butadiene or isoprene; a non-conjugated diene, such as 1,4-pentadiene; acrylic acid; an acrylic acid ester, such as methyl acrylate or ethyl acrylate; methacrylic acid; a methacrylic acid ester, such as methyl methacrylate or ethyl methacrylate; and vinyl acetate.

To improve the slipperiness of the film, the density of the component (B) is, for example, preferably 890 kg/m$^3$ or more, more preferably 895 kg/m$^3$ or more, still more preferably 900 kg/m$^3$ or more, yet still more preferably 905 kg/m$^3$ or more, yet still more preferably 910 kg/m$^3$ or more. To prevent or reduce generation of fish eyes in the film, the density of the component (B) is, for example, preferably 930 kg/m$^3$ or less, more preferably 925 kg/m$^3$ or less, still more preferably 920 kg/m$^3$ or less, yet still more preferably 915 kg/m$^3$ or less. The density of the component (B) may be 890 kg/m$^3$ or more and 930 kg/m$^3$ or less in one aspect, may be 895 kg/m$^3$ or more and 925 kg/m$^3$ or less in another aspect, may be 900 kg/m$^3$ or more and 920 kg/m$^3$ or less in yet another aspect, may be 905 kg/m$^3$ or more and 915 kg/m$^3$ or less in yet another aspect, or may be 910 kg/m$^3$ or more and 915 kg/m$^3$ or less in yet another aspect. The density can be controlled in the above range by regulating the α-olefin concentration in gas-phase polymerization in the method for producing the component (B) described below (method for producing ethylene-α-olefin copolymer).

To improve the formability of the film, particularly, to reduce the extrusion load during film formation, the MFR of the component (B) is, for example, preferably 0.5 g/10 min or more, more preferably 0.8 g/10 min or more, still more preferably 1.0 g/10 min or more. To improve the strength of the film, the MFR of the component (B) is preferably 5.0 g/10 min or less, more preferably 4.0 g/10 min or less, still more preferably 3.0 g/10 min or less, yet still more preferably 2.5 g/10 min or less. The MFR of the component (B) may be 0.5 g/10 min or more and 5.0 g/10 min or less in one aspect, may be 0.8 g/10 min or more and 4.0 g/10 min or less in another aspect, may be 1.0 g/10 min or more and 3.0 g/10 min or less in yet another aspect, or may be 1.0 g/10 min or more and 2.5 g/10 min or less in yet another aspect. The MFR of the component (B) is usually measured by using a sample prepared by blending the component (B) with about 1000 ppm (preferably 1000 ppm) of an antioxidant. The MFR can be controlled in the above range by regulating the concentration of a chain transfer agent in gas-phase polymerization in the method for producing the component (B) described below (method for producing ethylene-α-olefin copolymer).

The melt flow rate ratio (hereinafter also referred to as MFRR) of the component (B) is the ratio of the MFR measured at a temperature of 190° C. and a load of 21.60 kg to the MFR measured at a temperature of 190° C. and a load of 2.16 kg. To improve the formability of the film, particularly, to reduce the extrusion load during film formation, the MFRR is, for example, preferably 10 or more, more preferably 15 or more, still more preferably 17 or more, yet still more preferably 20 or more. To improve the strength of the film, the MFRR of the component (B) is, for example, preferably 30 or less, more preferably 28 or less, still more preferably 26 or less. The MFRR of the component (B) may be 10 or more and 30 or less in one aspect, may be 15 or more and 28 or less in another aspect, may be 17 or more and 26 or less in yet another aspect, or may be 20 or more and 26 or less in yet another aspect. To determine the MFRR of the component (B), a sample prepared by blending the component (B) with about 1000 ppm (preferably 1000 ppm) of an antioxidant is used in measuring each MFR. The MFRR can be determined by the method described below in Examples.

<Method for Producing Component (B)>

An example method for producing the component (B) (i.e., method for producing ethylene-α-olefin copolymer) includes copolymerizing ethylene and an α-olefin in the presence of a metallocene-based polymerization catalyst or a Ziegler-Natta polymerization catalyst.

Examples of the metallocene-based polymerization catalyst include the following catalysts (1) to (4).

(1) A catalyst including a component containing a transition metal compound having a group with a cyclopentadiene skeleton and a component containing an alumoxane compound.

(2) A catalyst including a component containing the above transition metal compound and an ionic compound, such as trityl borate or anilinium borate.

(3) A catalyst including a component containing the above transition metal compound, a component containing the above ionic compound, and an organoaluminum compound.

(4) A catalyst obtained by supporting each component described in any one of (1) to (3) on an inorganic particle carrier, such as SiO$_2$ or Al$_2$O$_3$, or a particle polymer carrier, such as a polymer of an olefin, such as ethylene or styrene, or impregnating an inorganic particle carrier, such as SiO$_2$ or Al$_2$O$_3$, or a particle polymer carrier, such as a polymer of an olefin, such as ethylene or styrene, with each component described in any one of (1) to (3).

Examples of the Ziegler-Natta polymerization catalyst include what is called a Mg—Ti Ziegler catalyst including a combination of an organoaluminum compound and a solid catalyst component having a titanium compound supported on a magnesium compound (see, for example, "Practical Dictionary of Catalysts, published by Kogyo Chosakai Publishing Co., Ltd., 2004" and "Systematic Diagram of Patent Application—transition of olefin polymerization catalysts—, published by Japan Institute of Invention and Innovation, 1995").

The catalyst used to produce the component (B) is preferably a metallocene-based polymerization catalyst to improve the strength of the film.

Examples of the method for polymerizing the component (B) include bulk polymerization, solution polymerization, slurry polymerization, gas-phase polymerization, and high-pressure ion polymerization. Bulk polymerization refers to polymerization using, as a medium, an olefin in the form of liquid at a polymerization temperature. Solution polymerization or slurry polymerization refers to polymerization in an inert hydrocarbon solvent, such as propane, butane, isobutane, pentane, hexane, heptane, or octane. Gas-phase polymerization refers to polymerization of a gaseous monomer in a medium of the gaseous monomer. These polymerization methods may be of batch type or continuous type, and may be single-stage polymerization in a single polymerization vessel or multi-stage polymerization in a polymerization apparatus including two or more polymerization reaction vessels connected in series. Various conditions (e.g., polymerization temperature, polymerization pressure, monomer concentration, amount of added catalyst, polymerization time) in the polymerization process can be appropriately set.

<Method for Producing Ethylene-Based Modifier>

Examples of the method for producing the ethylene-based modifier including the component (A) and the component (B) configured as described above include, but are not limited to, a method of melt-kneading the component (A) and the component (B). The amount of the component (A) is, for example, preferably 50 mass % or more and 90 mass % or less, more preferably 60 mass % or more and 90 mass % or less, still more preferably 70 mass % or more and 90 mass % or less, with respect to 100 mass % of the total mass of the component (A) and the component (B). The amount of the component (B) is, for example, preferably 10 mass % or more and 50 mass % or less, more preferably 10 mass % or more and mass % or less, still more preferably 10 mass % or more and 30 mass % or less, with respect to 100 mass % of the total mass of the component (A) and the component (B). The temperature at which the component (A) and the component (B) are melt-kneaded is, for example, preferably higher than the melting points of the component (A) and the component (B) by 20° C. or more. Examples of the shape of the ethylene-based modifier include, but are not limited to, pellets and a sheet. Examples of the apparatus for producing the ethylene-based modifier (apparatus for melt-kneading the component (A) and the component (B)) include various mixers, such as single-screw extruders, twin-screw extruders, Banbury mixers, and heat rolls.

<Ethylene-Based Resin Composition>

The average relaxation time of the ethylene-based resin composition according to this embodiment is 50 sec or more and 160 sec or less, preferably 55 sec or more and 159 sec or less, more preferably 60 sec or more and 158 sec or less. The average relaxation time can be determined by the method described below in Examples.

The ethylene-based resin composition preferably contains the ethylene-based modifier and the component (B). In this case, the ethylene-based resin composition contains the component (A) and the component (B). In the ethylene-based resin composition, the content of the component (A) with respect to 100 mass % of the total mass of the component (A) and the component (B) is preferably 50 mass % or more and 90 mass % or less, more preferably 60 mass % or more and 90 mass % or less, still more preferably 70 mass % or more and 90 mass % or less. In the ethylene-based resin composition, the content of the component (B) with respect to 100 mass % of the total mass of the component (A) and the component (B) is preferably 10 mass % or more and 50 mass % or less, more preferably 10 mass % or more and 40 mass % or less, still more preferably 10 mass % or more and 30 mass % or less. In the ethylene-based resin composition, the content of the component (A) with respect to 100 mass % of the total mass of the ethylene-based resin composition is preferably 15 mass % or more and 45 mass % or less, more preferably 18 mass % or more and 42 mass % or less, still more preferably 20 mass % or more and 40 mass % or less. In the ethylene-based resin composition, the total mass of the component (A) and the component (B) with respect to 100 mass % of the total mass of the ethylene-based resin composition is preferably 80 mass % or more, more preferably mass % or more, still more preferably 95 mass % or more.

The method for producing the ethylene-based resin composition according to this embodiment includes, for example, the following step 1 and the following step 2.

<Step 1>

A step of preparing the ethylene-based modifier in accordance with the method for producing the ethylene-based modifier described above.

<Step 2>

A step of melt-kneading the ethylene-based modifier obtained in the step 1 and the component (B) to provide an ethylene-based resin composition, wherein the ethylene-based resin composition contains the component (A) in the above percentage with respect to 100 mass % of the total mass of the ethylene-based resin composition.

Examples of the method for melt-kneading the ethylene-based modifier and the component (B) in the step 2 include methods using various mixers, such as single-screw extruders, twin-screw extruders, Banbury mixers, and heat rolls.

<Film>

A film according to this embodiment includes an ethylene-based resin layer containing the ethylene-based resin composition. When the ethylene-based resin composition contains the ethylene-based modifier and the component (B), the ethylene-based resin layer contains the ethylene-based modifier and the component (B). In this case, the ethylene-based resin layer contains the component (A) and the component (B).

The ethylene-based resin layer may contain a lubricant and/or an anti-blocking agent. The ethylene-based resin layer may further contain additives, such as an antioxidant, a neutralizer, a weathering agent, an antistatic agent, an anti-fogging agent, an anti-drip agent, a pigment, and a filler.

The film may be a single-layer film composed only of the ethylene-based resin layer, or may be a multi-layer film including the ethylene-based resin layer and another layer. When the film is a multi-layer film, the ethylene-based resin layer is preferably located on the outermost layer of the multi-layer film. In this case, the ethylene-based resin layer can be used as a sealant layer of the multi-layer film. Examples of another layer in the multi-layer film include a layer made of, for example, cellophane, paper, paperboard, woven fabric, aluminum foil, a polyamide resin, such as Nylon 6 or Nylon 66, a polyester resin, such as polyethylene terephthalate or polybutylene terephthalate, or a polypropylene resin.

The method for producing the film according to this embodiment includes, for example, the following step 1, the following step 2, and the following step 3.

<Step 1>

A step of preparing the ethylene-based modifier in accordance with the method for producing the ethylene-based modifier described above.

<Step 2>

A step of melt-kneading the ethylene-based modifier obtained in the step 1 and the component (B) to provide an ethylene-based resin composition, wherein the ethylene-based resin composition contains the component (A) in the above percentage with respect to 100 mass % of the total mass of the ethylene-based resin composition.

<Step 3>

A step of forming a film having the ethylene-based resin layer by a cast film process using the ethylene-based resin composition obtained in the step 2.

The cast film process of the present invention involves extruding a molten resin through a T-shaped die to form a non-stretched flat film. Since the cast film process usually includes applying a predetermined tension to the film to prevent generation of wrinkles and slack in the film in the process from the first cooling roll to the winder, the film may be stretched about 1.0 to 1.5 times in the machine direction until the film is wound by the winder after being solidified on the first cooling roll, which is included in the scope of the cast film in the present invention.

Examples of the method for producing a multi-layer film include a lamination method in which a single-layer film forming the ethylene-based resin layer is attached to a single-layer film forming another layer. Examples of the lamination method include a dry lamination method, a wet lamination method, and a sandwich lamination method. The lamination method is preferably a dry lamination method. Examples of other methods include a method (co-extrusion method) for forming a multi-layer film by separately melting an ethylene-based resin composition forming the ethylene-based resin layer and a resin composition forming another layer, layering these resin compositions in a feedblock, and extruding the layered product from a T-die or the like.

The film according to this embodiment can be used as various types of packaging materials. For example, the film according to this embodiment can be used as a packaging material (e.g., packaging pouch) for packaging, for example, foods, beverages, seasonings, milk and the like, dairy products, pharmaceuticals, electronic parts such as semiconductor products, pet foods, pet care products, detergents, and toiletries.

According to the embodiments, an ethylene-based modifier, an ethylene-based resin composition, and a method for producing the ethylene-based resin composition with/by which a film having good slipperiness and relatively less fish eyes can be formed can be provided. According to the embodiments, a film having good slipperiness and relatively less fish eyes and a method for producing the film can also be provided.

Specifically, the ethylene-based modifier according to this embodiment has a strain-hardening exponent of 0.27 or more and 0.53 or less as determined by the LAOS method. Accordingly, the film having good slipperiness and relatively less fish eyes can be formed.

The ethylene-based modifier according to this embodiment contains the component (A) and the component (B) and may contain the above mass percent of the component (A) and the above mass percent of the component (B) with respect to 100 mass % of the total mass of the component (A) and the component (B). Accordingly, the film having good slipperiness and relatively less fish eyes can be formed.

The ethylene-based resin composition according to this embodiment has an average relaxation time of 50 sec or longer and 160 sec or shorter. Accordingly, the film having good slipperiness and relatively less fish eyes can be formed.

The ethylene-based resin composition according to this embodiment contains the ethylene-based modifier and the component (B). The ethylene-based modifier contains the component (A) and the component (B) and contains the above mass percent of the component (A) and the above mass percent of the component (B) with respect to 100 mass % of the total mass of the component (A) and the component (B). The content of the component (A) with respect to 100 mass % of the total mass of the ethylene-based resin composition may be the above mass percent. Accordingly, the film having good slipperiness and relatively less fish eyes can be formed.

A film according to this embodiment includes an ethylene-based resin layer containing the ethylene-based resin composition. Accordingly, the film has good slipperiness and relatively less fish eyes.

The method for producing the ethylene-based resin composition according to this embodiment includes the step 1 and the step 2. Accordingly, the film having good slipperiness and relatively less fish eyes can be formed.

The method for producing the film according to the present invention includes the step 1, the step 2, and the step 3. Accordingly, the film having an ethylene-based resin layer with good slipperiness and relatively less fish eyes can be formed.

The ethylene-based modifier, the ethylene-based resin composition, the film, the method for producing an ethylene-based resin composition, and the method for producing a film according to the present invention are not limited to the above embodiments and can be variously modified without departing from the scope of the present invention. Configurations, methods, or the like of embodiments other than those described above may be freely employed and combined, and the configuration, method, or the like according to one of the embodiments may be used as the configuration, method, or the like according to one of the other embodiments.

EXAMPLES

The present invention will be specifically described below on the basis of Examples and Comparative Examples, but the present invention is not limited to these Examples.

<Elemental Analysis>

Zn: A sample was placed in a sulfuric acid aqueous solution (1 M) and then sonicated to extract metal components. The obtained liquid portion was quantitatively analyzed by ICP emission spectrometry.

F: The combustion gas generated by burning a sample in a flask filled with oxygen was absorbed into a sodium hydroxide aqueous solution (10%), and the obtained aqueous solution was quantitatively analyzed by using an ion-selective electrode.

<Melt Flow Rate (MFR, Unit: g/10 min)>

The MFR at a load of 2.16 kg and the MFR at a load of 21.60 kg were measured at a temperature of 190° C. in accordance with the method A in the method defined in JIS K7210-1995.

<Melt Flow Rate Ratio (MFRR)>

The MFRR is the ratio of the MFR measured at a temperature of 190° C. and a load of 21.60 kg to the MFR measured at a temperature of 190° C. and a load of 2.16 kg.

<Density (unit: kg/m$^3$)>

The density was measured in accordance with the method defined in the method A in JIS K7112-1980. A sample was annealed as described in JIS K6760-1995.

<Limiting Viscosity ([η], unit: dl/g)>

A polymer was dissolved in a tetralin solvent, and the limiting viscosity was measured at 135° C. using an Ubbelohde viscometer.

<Mw/Mn>

The polystyrene-equivalent weight-average molecular weight (Mw) and number-average molecular weight (Mn) obtained by gel permeation chromatography (GPC) were calculated. The Mw was divided by the Mn to obtain a molecular weight distribution (Mw/Mn).

Apparatus: Waters 150 C available from Waters Corporation
Separation column: TOSOH TSKgel GMH-HT
Measurement temperature: 140° C.
Carrier: orthodichlorobenzene
Flow rate: 1.0 mL/min
Injection volume: 500 μL
Detector: differential refractometer
Molecular weight standard substance: standard polystyrene <LAOS Method Strain-Hardening Exponent (Unit: -)>
(LAOS Method: Large Amplitude Oscillatory Shear Method)

Pellets of the ethylene-based modifier were preheated at a temperature of 150° C. for 5 minutes and pressed at a pressure of 5 MPa and a temperature of 150° C. for 5 minutes by using a heat press machine, and cooled at a temperature of 25° C. to 27° C. for 5 minutes to form a pressed sheet with a thickness of 0.5 mm. The obtained pressed sheet was punched out into a circular shape with a diameter of 8 mm to prepare a test piece for measurement.

The device was a strain-controlled rotational rheometer (TA Instruments, ARES-G2). In the device, a p 8 mm cone plate (0.1 rad) and a φ 8 mm parallel plate were respectively used as an upper jig and a lower jig, and preheating was performed at a temperature of 210° C. for 30 minutes. The gap of the cone plate was adjusted to about mm, and after adjustment, the test piece was left to stand for about 5 minutes, followed by measurement.

In the measurement of G'M315% and the measurement of G'L315%, a sinusoidal shear strain was applied to the test piece at a frequency of 0.05 Hz for 6 cycles, and the average value for the last three cycles was used as the measured value. The strain $\gamma_0$=10% to 100%, 100% to 1000%, 1000% to 10000% was respectively divided into ten parts according to logarithmic scales, and the stress response in the range of strain $\gamma_0$=10% to 3000% was measured.

The obtained stress response was analyzed (TA Instruments, software name: TORIOS), and G'M315% and G'L315% at $\gamma_0$=315% were calculated in accordance with the reference (R. H. Ewoldt et al., J. Rheol., 52, 1427 (2008)) to obtain a LAOS method strain-hardening exponent.

<Average Relaxation Time (Unit: Sec)>

The average relaxation time is the relaxation time that occupies the steady rheological behavior obtained by creep testing and focuses on a long relaxation time.

A sample cut out from a cast film formed by the method described below was preheated at a temperature of 150° C. for 5 minutes and pressed at a pressure of 5 MPa and a temperature of 150° C. for 5 minutes by using a heat press machine, and cooled at a temperature of 25° C. to 27° C. for 5 minutes to form a test piece for measurement having a diameter of about 25 mm and a thickness of about 1 mm.

Creep testing was conducted by using a strain-controlled rotational rheometer (TA Instruments, ARES-G2) to obtain an average relaxation time. Specifically, parallel plates were installed into the device, followed by preheating at 210° C. for about 30 minutes. After preheating, the test piece formed by heat pressing was set between the parallel plates and heated for about 5 minutes. The gap between the parallel plates was adjusted to about 1 mm, and after adjustment, the test piece was left to stand for about 5 minutes and subjected to creep testing.

Measurement for determining creep control parameters was performed at 210° C. and 5%, and creep testing was then conducted at a temperature of 210° C. and a stress of 500 Pa for 3600 seconds.

Using the obtained time and the creep compliance data, linear fitting (Y=Ax+B, Y: creep compliance, x: time (sec)) was performed in the range of 1500 seconds to 3600 seconds. The slope A and the Y-intercept B were determined, and the average relaxation time $\tau_w$ was calculated from the following formula (2).

$$\tau_w = B/A \quad (2)$$

<Friction Angle Tan θ (Slipperiness)>

Two sample films of 160 mm (length)×80 mm (width) were cut out from the produced film.

One (hereinafter referred to as sample film (1)) of the two films was placed on the inclined plate of a friction angle tester (available from Toyo Seiki Seisakusho Co., Ltd). The other film (hereinafter sample film (2)) was attached to the lower surface of a thread (weight 1 kg) of 100 mm (length)×65 mm (width).

The sample film (2) attached to the thread was placed in contact with the sample film (1) placed on the inclined plate. The inclined plate was inclined at an inclination rate of 2.7°/sec, and the angle θ at which the thread started to move was measured and expressed as tan θ (surface-surface). The smaller the tan θ, the better the slipperiness.

<Number of Fish Eye (FE) Counts (Unit: Fish Eyes/200 cm$^2$)>

Using a desktop CCD camera defect inspection machine (available from Mamiya-OP Co., Ltd.), the sample film was spread on the stage, and fish eyes (FEs) with a diameter of mm or more were counted. The measurement area was 16.35 cm×12 cm, and the quantity of light was 100. The smaller the number of FE counts is, the more preferred it is.

Production of Component (A)

As the component (A), a component (A-1) and a component (A-2) produced in accordance with Production Examples below were used.

Production Example 1

Production of Component (H)

A component (H) was produced by the same method as in the preparation of the component (A) in Examples 1 (1) and (2) described in JP-A-2009-79180. As a result of elemental analysis, Zn=11 mass %, and F=6.4 mass %.

Production of Prepolymerization Catalyst Component

After adding 34.6 vol % of butane to an autoclave equipped with a stirrer and previously purged with nitrogen, 0.5 mmol/L of racemic-ethylenebis(1-indenyl) zirconium diphenoxide was added. The autoclave was heated to 50° C., and the mixture was stirred for 2 hours. Next, 5.03 g/L of the produced component (H) was added to the autoclave. The autoclave was then cooled to 30° C. After the system was stabilized, 0.42 g/L of ethylene and vol % of hydrogen (normal temperature and normal pressure) were added to the autoclave, and 0.29 vol % of a hexane solution prepared by diluting triisobutylaluminum with n-hexane to 20 wt % was subsequently added to initiate prepolymerization. Ethylene and hydrogen (normal temperature and normal pressure) were supplied to the autoclave for 30 minutes at 5 g/L and 0.5 vol % per hour, respectively. The autoclave was then heated to 50° C., and ethylene and hydrogen (normal temperature and normal pressure) were supplied to the autoclave at 13.25 g/L and 4.5 vol % per hour, respectively. Prepolymerization was carried out for total 15.4 hours. After completion of prepolymerization, the remaining solid was vacuum-dried at room temperature by purging with ethylene, butane, hydrogen, and the like to provide a prepolymerization catalyst component containing 41.1 g of polyethylene per gram of the component (H). The [η] of the polyethylene was 1.21 dl/g. The obtained prepolymerization catalyst component was then introduced into Hi-Bolter (available from Toyo Hitec Co. Ltd.) having a screen with a mesh size of 162 μm to remove fine powder in a nitrogen atmosphere, providing a prepolymerization catalyst component with no fine prepolymerization catalyst component.

Production of Polymer (Component (A-1))

In the presence of the obtained prepolymerization catalyst component, ethylene, 1-butene, and 1-hexene were copolymerized in a continuous fluidized-bed gas-phase polymerization apparatus to provide a powder of ethylene-1-butene-1-hexene copolymer (hereinafter referred to as component (A-1)). The polymerization conditions were as follows: the polymerization temperature was 89° C.; the polymerization pressure was 2 MPa; the average ratio of hydrogen amount to 100 mol % of ethylene was 0.35%; and the molar ratio of 1-butene was 1.45% and the molar ratio of 1-hexene was 0.53%, with respect to the total amount of ethylene, 1-butene, and 1-hexene. During polymerization, ethylene, 1-butene, 1-hexene, and hydrogen were continuously supplied to keep the gas composition constant. The prepolymerization catalyst component, triisobutylaluminum (molar ratio of triisobutylaluminum to mass of powder of component (A-1): 0.44 mol/t), triethylamine (molar ratio to triisobutylaluminum: 10.7%), and oxygen (molar ratio to triisobutylaluminum: 24%) were continuously supplied. The order of contact between the prepolymerization catalyst component, triisobutylaluminum, triethylamine, and oxygen was as follows:

triisobutylaluminum was first brought into contact with oxygen to form a contact treatment product; the contact treatment product was next brought into contact with triethylamine to form a coordination compound; and the coordination compound was introduced into a gas-phase polymerization vessel and finally brought into contact with the prepolymerization catalyst component. The average polymerization time was 7.4 hours. The powder of the component (A-1) was transferred to a hopper through a transfer pipe connecting the continuous fluidized-bed gas-phase polymerization apparatus and the hopper to each other.

A mixed gas prepared by mixing nitrogen and water and heating the mixture to 65° C. was introduced into the hopper to bring the powder of the component (A-1) into contact with water. The time of contact with water in the hopper was 1.3 hours. The powder of the component (A-1) after contact with water was transferred to another hopper through a transfer pipe, and the powder of the component (A-1) was dried by circulating nitrogen in the hopper. The dried powder of the component (A-1) was granulated at a feed rate of 50 kg/hr, a screw rotational speed of 450 rpm, a gate opening degree of 50%, a suction pressure of 0.1 MPa, and a resin temperature of 200° C. to 230° C. using an extruder (LCM50, available from Kobe Steel, Ltd.) to provide pellets of the component (A-1). The physical properties of the obtained pellets of the component (A-1) were evaluated. The results are shown in Table 1.

Production Example 2

Production of Polymer (Component (A-2))

In the presence of the prepolymerization catalyst component of Production Example 1, ethylene, 1-butene, and 1-hexene were copolymerized in a continuous fluidized-bed gas-phase polymerization apparatus to provide a powder of ethylene-1-butene-1-hexene copolymer (hereinafter referred to as component (A-2)). The polymerization conditions were as follows: the polymerization temperature was 89° C.; the polymerization pressure was 2 MPa; the average ratio of hydrogen amount to 100 mol % of ethylene was 0.35%; and the molar ratio of 1-butene was 1.34% and the molar ratio of 1-hexene was 0.52%, with respect to the total amount of ethylene, 1-butene, and 1-hexene. During polymerization, ethylene, 1-butene, 1-hexene, and hydrogen were continuously supplied to keep the gas composition constant. The prepolymerization catalyst component, triisobutylaluminum (molar ratio of triisobutylaluminum to mass of powder of component (A-2): 0.40 mol/t), triethylamine (molar ratio to triisobutylaluminum: 9.7%), and oxygen (molar ratio to triisobutylaluminum: 24%) were continuously supplied. The order of contact between the prepolymerization catalyst component, triisobutylaluminum, triethylamine, and oxygen was the same as in Production Example 1. The average polymerization time was 7.1 hours.

The powder of the component (A-2) was transferred to a hopper through a transfer pipe connecting the continuous fluidized-bed gas-phase polymerization apparatus and the hopper to each other. Water heated to 100° C. or higher was introduced into the hopper to bring the powder of the component (A-2) into contact with water. The time of contact with water in the hopper was 1.3 hours. The powder of the component (A-2) after contact with water was transferred to another hopper through a transfer pipe, and the powder of the component (A-2) was dried by circulating nitrogen in the hopper. The dried powder of the component (A-2) was granulated at a feed rate of 50 kg/hr, a screw rotational speed of 450 rpm, a gate opening degree of 50%, a suction pressure of 0.1 MPa, and a resin temperature of 200° C. to 230° C. using an extruder (LCM50, available from Kobe Steel, Ltd.) to provide pellets of the component (A-2). The physical properties of the obtained pellets of the component (A-2) were evaluated. The results are shown in Table 1.

Component (B) LLDPE

The following component (B-1) and the following component (B-2) were used as the component (B).

Ethylene-α-olefin copolymer 1 (component (B-1)): metallocene-catalyst linear low density polyethylene Sumikathene E FV402 (available from Sumitomo Chemical Co., Ltd., ethylene-1-hexene copolymer (lubricant, no anti-blocking agent), MFR=3.5 g/10 min, density=913 kg/m$^3$, MFRR=17)

Ethylene-α-olefin copolymer 2 (component (B-2)): metallocene-catalyst linear low density polyethylene Sumikathene E FV203N (available from Sumitomo Chemical Co., Ltd., ethylene-1-hexene copolymer (no additive), MFR=2.0 g/10 min, density=913 kg/m$^3$, MFRR=17)

Ethylene Polymer LDPE

The following ethylene polymer (LDPE1) was used in Comparative Examples below.

Ethylene polymer 1 (LDPE1): high-pressure method low-density polyethylene Sumikathene G201-F (available from Sumitomo Chemical Co., Ltd., high-pressure method low-density polyethylene (no additive), MFR=2.0 g/10 min, density=919 kg/m$^3$, MFRR=41)

Ethylene-Based Modifier

Example 11

Pellets of an ethylene-based modifier were produced by blending the component (A-1) and the component (B-1) at a composition ratio of 90:10, and granulating the resulting blend at a feed rate of 50 kg/hr, a screw rotational speed of 450 rpm, a gate opening degree of 50%, a suction pressure of 0.1 MPa, and a resin temperature of 200° C. to 230° C. using an extruder (LCM50, available from Kobe Steel, Ltd). The physical properties of the obtained pellets are shown in Table 2.

Example 12

Pellets of an ethylene-based modifier were produced in the same manner as in Example 11 except that the component (A-1) and the component (B-2) were blended at a composition ratio of 90:10. The physical properties of the obtained pellets are shown in Table 2.

Example 13

Pellets of an ethylene-based modifier were produced by blending the component (A-2) and the component (B-1) at a composition ratio of 70:30, and granulating the resulting blend at a feed rate of 50 kg/hr, a screw rotational speed of 338 rpm, a gate opening degree of 50%, a suction pressure of 0.1 MPa, and a resin temperature of 190° C. using an extruder (LCM50, available from Kobe Steel, Ltd). The physical properties of the obtained pellets are shown in Table 2.

Comparative Example 11

Pellets of the component (A-2) were used. The physical properties of the pellets are shown in Table 2.

Comparative Example 12

Pellets of LDPE1 were used. The physical properties of the pellets are shown in Table 2.

Formation of Cast Film

Example 21

The ethylene-based modifier of Example 11 and the ethylene-α-olefin copolymer 1 of the component (B-1) were blended at the composition ratio shown in Table 3 and mixed in a Tumble mixer. Next, the resulting mixture was processed into a film by using a three-layer co-extrusion cast film machine available from SHI Modern Machinery, Ltd. to provide a film (cast film) having a one-type three-layer structure.

With regard to film formation, two surface layers were formed by, using single flight-type screw extruders each having a diameter of 40 mm and L/D of 32 (L is the length of the cylinder of an extruder, D is the diameter of the cylinder of the extruder), melt-kneading a resin at 230° C. and then guiding the resin to two surface layer sides in the feedblock. The middle layer was formed by, using a single flight-type screw extruder having a diameter of 50 mm and L/D of 32, melt-kneading a resin at 230° C. and then guiding the resin to the middle layer side in the feedblock. The resin that had passed through the feedblock was extruded from a cast die (600 mm wide) controlled at 230° C. and then cooled to a solid by taking the resin up with chill rolls at 75° C., and a one-type three-layer film (cast film) having a total thickness of 50 μm was rolled around a cardboard core at a line speed of 20 m/min. The draft ratio in this case was 18. The physical properties of the obtained cast film are shown in Table 3.

Example 22

A cast film was produced in the same manner as in Example 21 except that the ethylene-based modifier of Example 12 and the ethylene-α-olefin copolymer 1 of the component (B-1) were blended at the composition ratio shown in Table 3 and mixed in a Tumble mixer. The physical properties of the obtained cast film are shown in Table 3.

Example 23

A cast film was produced in the same manner as in Example 21 except that the ethylene-based modifier of Example 13 and the ethylene-α-olefin copolymer 1 of the component (B-1) were blended at the composition ratio shown in Table 3 and mixed in a Tumble mixer. The physical properties of the obtained cast film are shown in Table 3.

Comparative Example 21

A cast film was produced in the same manner as in Example 21 except that the component (A-2) of Comparative Example 11 and the ethylene-α-olefin copolymer 1 of the component (B-1) were blended at the composition ratio shown in Table 3 and mixed in a Tumble mixer. The physical properties of the obtained cast film are shown in Table 3.

Comparative Example 22

A cast film was produced in the same manner as in Example 21 except that the ethylene polymer 1 (LDPE1) of Comparative Example 12 and the ethylene-α-olefin copolymer 1 of the component (B-1) were blended at the composition ratio shown in Table 3 and mixed in a Tumble mixer. The physical properties of the obtained cast film are shown in Table 3.

Comparative Example 23

A cast film was produced in the same manner as in Example 21 except that the ethylene-based modifier of Example 11 and the ethylene-α-olefin copolymer 1 of the component (B-1) were blended at the composition ratio shown in Table 3 and mixed in a Tumble mixer. The physical properties of the obtained cast film are shown in Table 3.

TABLE 1

| Component (A) | | A-1 | A-2 |
|---|---|---|---|
| MFR | g/10 min | 0.053 | 0.078 |
| Density | kg/m$^3$ | 928.1 | 927.5 |
| [η] | dl/g | 1.41 | 1.47 |
| Mw/Mn | — | 10.0 | 7.8 |

TABLE 2

| Modifier | A-1 Content (mass %) | A-2 Content (mass %) | B-1 (FV402) Content (mass %) | B-2 (FV203N) Content (mass %) | LDPE1 (G201-F) Content (mass %) | MFR (g/10 min) | Density (kg/m$^3$) | LAOS Method Strain-Hardening Exponent (−) |
|---|---|---|---|---|---|---|---|---|
| Example 11 | 90 | | 10 | | | 0.10 | 928.6 | 0.47 |
| Example 12 | 90 | | | 10 | | 0.08 | 927.3 | 0.44 |
| Example 13 | | 70 | 30 | | | 0.25 | 923.1 | 0.27 |
| Comparative Example 11 | | 100 | | | | 0.08 | 927.5 | 0.54 |
| Comparative Example 12 | | | | | 100 | 2.0 | 919.2 | 0.26 |

TABLE 3

| | | Modifier | | | Average | | Number of FE Counts |
|---|---|---|---|---|---|---|---|
| Composition and Film | B-1 Content (mass %) | Type of modifier | Content (mass %) | Component (A) content (mass %) | Component (B) content (mass %) | Relaxation Time sec | Slipperiness tan θ | fish eyes/200 cm$^2$ |
| Example 21 | 70 | Example 11 | 30 | 27 | 3 | 128 | 1.20 | 9.4 |
| Example 22 | 70 | Example 12 | 30 | 27 | 3 | 117 | 1.38 | 1.6 |
| Example 23 | 43 | Example 13 | 57 | 40 | 17 | 157 | 1.37 | 3.3 |
| Comparative Example 21 | 70 | Comparative Example 11 | 30 | 30 | 0 | 163 | 1.02 | 35.0 |
| Comparative Example 22 | 70 | Comparative Example 12 | 30 | — | — | 8 | 1.94 | 0.4 |
| Comparative Example 23 | 89 | Example 11 | 11 | 9.9 | 1.1 | 42 | >2.75 | 25.0 |

Summary

The results in Table 3 indicate that Examples show better slipperiness and a smaller number of FE counts than Comparative Examples. Specifically, the formation of an ethylene-based resin composition using the ethylene-based modifier according to the present invention can impart good slipperiness to a film having an ethylene-based resin layer containing the ethylene-based resin composition and can prevent or reduce generation of fish eyes in the ethylene-based resin layer.

What is claimed is:

1. An ethylene-based resin composition having an average relaxation time of 50 sec or longer and 160 sec or shorter, wherein the ethylene-based resin composition comprises:
    an ethylene-based modifier and a component (B) below, wherein the ethylene-based modifier contains a component (A) below and the component (B), and contains 50 mass % or more and 90 mass % or less of the component (A) and 10 mass % or more and 50 mass % or less of the component (B) with respect to 100 mass % of a total mass of the component (A) and the component (B), and
    a content of the component (A) with respect to 100 mass % of a total mass of the ethylene-based resin composition is 15 mass % or more and 45 mass % or less:
    Component (A): ethylene-α-olefin copolymer,
        density: 915 kg/m$^3$ or more and 950 kg/m$^3$ or less,
        ratio (Mw/Mn) of weight-average molecular weight to number-average molecular weight: 7.3 or more,
    Component (B): ethylene-α-olefin copolymer,
        density: 890 kg/m$^3$ or more and 930 kg/m$^3$ or less,
        MFR: 0.5 g/10 min or more and 5.0 g/10 min or less,
        MFRR: 10 or more and 30 or less.

2. A method for producing an ethylene-based resin composition having an average relaxation time of 50 sec or longer and 160 sec or shorter, the method comprising:
    a step 1 below and a step 2 below:
    <Step 1>
    a step of melt-kneading 50 mass % or more and 90 mass % or less of a component (A) below and 10 mass % or more and 50 mass % or less of a component (B) below with respect to 100 mass % of a total mass of the component (A) and the component (B) to provide an ethylene-based modifier,
    <Step 2>
    a step of melt-kneading the ethylene-based modifier obtained in the step 1 and the component (B) to provide an ethylene-based resin composition, wherein the ethylene-based resin composition contains 15 mass % or more and 45 mass % or less of the component (A) with respect to 100 mass % of a total mass of the ethylene-based resin composition:
    Component (A): ethylene-α-olefin copolymer,
        density: 915 kg/m$^3$ or more and 950 kg/m$^3$ or less,
        ratio (Mw/Mn) of weight-average molecular weight to number-average molecular weight: 7.3 or more,
    Component (B): ethylene-α-olefin copolymer,
        density: 890 kg/m$^3$ or more and 930 kg/m$^3$ or less,
        MFR: 0.5 g/10 min or more and 5.0 g/10 min or less,
        MFRR: 10 or more and 30 or less.

3. An ethylene-based resin composition produced by the method according to claim 2.

4. A method for producing a film having an ethylene-based resin layer containing an ethylene-based resin composition having an average relaxation time of 50 sec or longer and 160 sec or shorter, the method comprising:
a step 1 below, a step 2 below, and a step 3 below:
<Step 1>
a step of melt-kneading 50 mass % or more and 90 mass % or less of a component (A) below and 10 mass % or more and 50 mass % or less of a component (B) below with respect to 100 mass % of a total mass of the component (A) and the component (B) to provide an ethylene-based modifier,
<Step 2>
a step of melt-kneading the ethylene-based modifier obtained in the step 1 and the component (B) to provide an ethylene-based resin composition, wherein the ethylene-based resin composition contains 15 mass % or more and 45 mass % or less of the component (A) with respect to 100 mass % of a total mass of the ethylene-based resin composition,
<Step 3>
a step of forming a film having an ethylene-based resin layer by a cast film process using the ethylene-based resin composition obtained in the step 2,
Component (A): ethylene-α-olefin copolymer,
density: 915 kg/m$^3$ or more and 950 kg/m$^3$ or less,
ratio (Mw/Mn) of weight-average molecular weight to number-average molecular weight: 7.3 or more,
Component (B): ethylene-α-olefin copolymer,
density: 890 kg/m$^3$ or more and 930 kg/m$^3$ or less,
MFR: 0.5 g/10 min or more and 5.0 g/10 min or less,
MFRR: 10 or more and 30 or less.

5. A film produced by the method according to claim 4.

6. A film comprising:
an ethylene-based resin layer containing the ethylene-based resin composition according to claim 1.

7. A method for producing the ethylene-based resin composition according to claim 1, the method comprising:
a step 1 below and a step 2 below:
<Step 1>
a step of melt-kneading 50 mass % or more and 90 mass % or less of a component (A) below and 10 mass % or more and 50 mass % or less of a component (B) below with respect to 100 mass % of a total mass of the component (A) and the component (B) to provide an ethylene-based modifier,
<Step 2>
a step of melt-kneading the ethylene-based modifier obtained in the step 1 and the component (B) to provide an ethylene-based resin composition, wherein the ethylene-based resin composition contains 15 mass % or more and 45 mass % or less of the component (A) with respect to 100 mass % of a total mass of the ethylene-based resin composition:
Component (A): ethylene-α-olefin copolymer,
density: 915 kg/m$^3$ or more and 950 kg/m$^3$ or less,
ratio (Mw/Mn) of weight-average molecular weight to number-average molecular weight: 7.3 or more,
Component (B): ethylene-α-olefin copolymer,
density: 890 kg/m$^3$ or more and 930 kg/m$^3$ or less,
MFR: 0.5 g/10 min or more and 5.0 g/10 min or less,
MFRR: 10 or more and 30 or less.

8. An ethylene-based resin composition produced by the method according to claim 7.

9. A method for producing the film according to claim 6 having an ethylene-based resin layer, the method comprising:
a step 1 below, a step 2 below, and a step 3 below:
<Step 1>
a step of melt-kneading 50 mass % or more and 90 mass % or less of a component (A) below and 10 mass % or more and 50 mass % or less of a component (B) below with respect to 100 mass % of a total mass of the component (A) and the component (B) to provide an ethylene-based modifier,
<Step 2>
a step of melt-kneading the ethylene-based modifier obtained in the step 1 and the component (B) to provide an ethylene-based resin composition, wherein the ethylene-based resin composition contains 15 mass % or more and 45 mass % or less of the component (A) with respect to 100 mass % of a total mass of the ethylene-based resin composition,
<Step 3>
a step of forming a film having an ethylene-based resin layer by a cast film process using the ethylene-based resin composition obtained in the step 2,
Component (A): ethylene-α-olefin copolymer,
density: 915 kg/m$^3$ or more and 950 kg/m$^3$ or less,
ratio (Mw/Mn) of weight-average molecular weight to number-average molecular weight: 7.3 or more,
Component (B): ethylene-α-olefin copolymer,
density: 890 kg/m$^3$ or more and 930 kg/m$^3$ or less,
MFR: 0.5 g/10 min or more and 5.0 g/10 min or less,
MFRR: 10 or more and 30 or less.

10. A film produced by the method according to claim 9.

* * * * *